(12) United States Patent
Kroll et al.

(10) Patent No.: US 12,242,496 B2
(45) Date of Patent: Mar. 4, 2025

(54) FUTURE SCHEDULER FOR DATABASE SYSTEMS

(71) Applicant: Snowflake Inc., Bozeman, MT (US)

(72) Inventors: Marco H. Kroll, Berlin (DE); Mariusz Kwiczala, Berlin (DE); Prayag Chandran Nirmala, Seattle, WA (US); William Waddington, Stateline, NV (US); Shijie Xu, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/151,327

(22) Filed: Jan. 6, 2023

(65) Prior Publication Data
US 2024/0232213 A1 Jul. 11, 2024

(51) Int. Cl.
G06F 16/25 (2019.01)
G06F 9/48 (2006.01)
G06F 16/2455 (2019.01)

(52) U.S. Cl.
CPC .......... G06F 16/254 (2019.01); G06F 9/4881 (2013.01); G06F 16/2455 (2019.01)

(58) Field of Classification Search
CPC ... G06F 16/254; G06F 16/2455; G06F 9/4881
See application file for complete search history.

(56) References Cited

U.S. PATENT DOCUMENTS 11,175,950 B1 * 11/2021 Yang .................. G06F 9/3838
2022/0129307 A1 * 4/2022 Strenski ............. G06F 9/4881
2023/0214395 A1 * 7/2023 Koleva ............ G06F 16/24569
707/769

OTHER PUBLICATIONS

Wei X, Wang H, Li H, Zou L. Dynamic deployment and management of elastic virtual clusters. In2011 Sixth Annual Chinagrid Conference Aug. 22, 2011 (pp. 35-41). IEEE. (Year: 2011).*
Coutinho RD, Drummond LM, Frota Y, de Oliveira D. Optimizing virtual machine allocation for parallel scientific workflows in federated clouds. Future Generation Computer Systems. May 1, 2015;46:51-68. (Year: 2015).*
Zhu QH, Tang H, Huang JJ, Hou Y. Task scheduling for multi-cloud computing subject to security and reliability constraints. IEEE/CAA Journal of Automatica Sinica. Mar. 10, 2021;8(4):848-65. (Year: 2021).*
WM Ribeiro M, AB Lima A, de Oliveira D. Olap parallel query processing in clouds with C-ParGRES. Concurrency and Computation: Practice and Experience. Apr. 10, 2020;32(7):e5590. (Year: 2020).*
Irwin D, Chase J, Grit L, Yumerefendi A, Becker D, Yocum KG. Sharing networked resources with brokered leases. resource. Jun. 2006;6:6. (Year: 2006).*

* cited by examiner

*Primary Examiner* — Mohsen Almani
(74) *Attorney, Agent, or Firm* — Schwegman Lundberg & Woessner, P.A.

(57) ABSTRACT

The subject technology receives a query, the query comprising a set of query statements. The subject technology determines that a set of resources to be utilized by the query during execution is provided by a slot, the slot comprising an allocation of resources provided by a virtual warehouse. The subject technology performs a first scheduling process for execution of the query using the slot. The subject technology determines that an available slot is provided by the virtual warehouse. The subject technology executes, using the virtual warehouse, the query using the available slot.

30 Claims, 7 Drawing Sheets

FUTURE SCHEDULER FOR DATABASE SYSTEMS

TECHNICAL FIELD

The present disclosure relates to systems, methods, and devices for databases and more particularly relates to scheduling tasks to be executed on database data.

BACKGROUND

Databases are widely used for data storage and access in computing applications. Databases may include tables having rows and columns that include or reference data that can be read, modified, or deleted using queries.

Tasks or commands can be executed on database data to manipulate or alter the data. Such tasks can be requested by a client account and may manipulate database data to make it more useful for the client account. In certain implementations, it may be beneficial to schedule the automatic execution of certain tasks to streamline database systems.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

Systems, methods, and devices for scheduling tasks to be executed on database data are disclosed. Tasks, such as structured query language (SQL) statements, can be executed on database data to manipulate or alter the data. A task may include any function and may include user-defined logic received from a client account. In certain implementations, it may be beneficial to schedule the automatic execution of a task in response to one or more trigger events. In an embodiment, task execution can be triggered by the complete execution of a transaction such as inserting, deleting, or updating database data.

Figure 1:
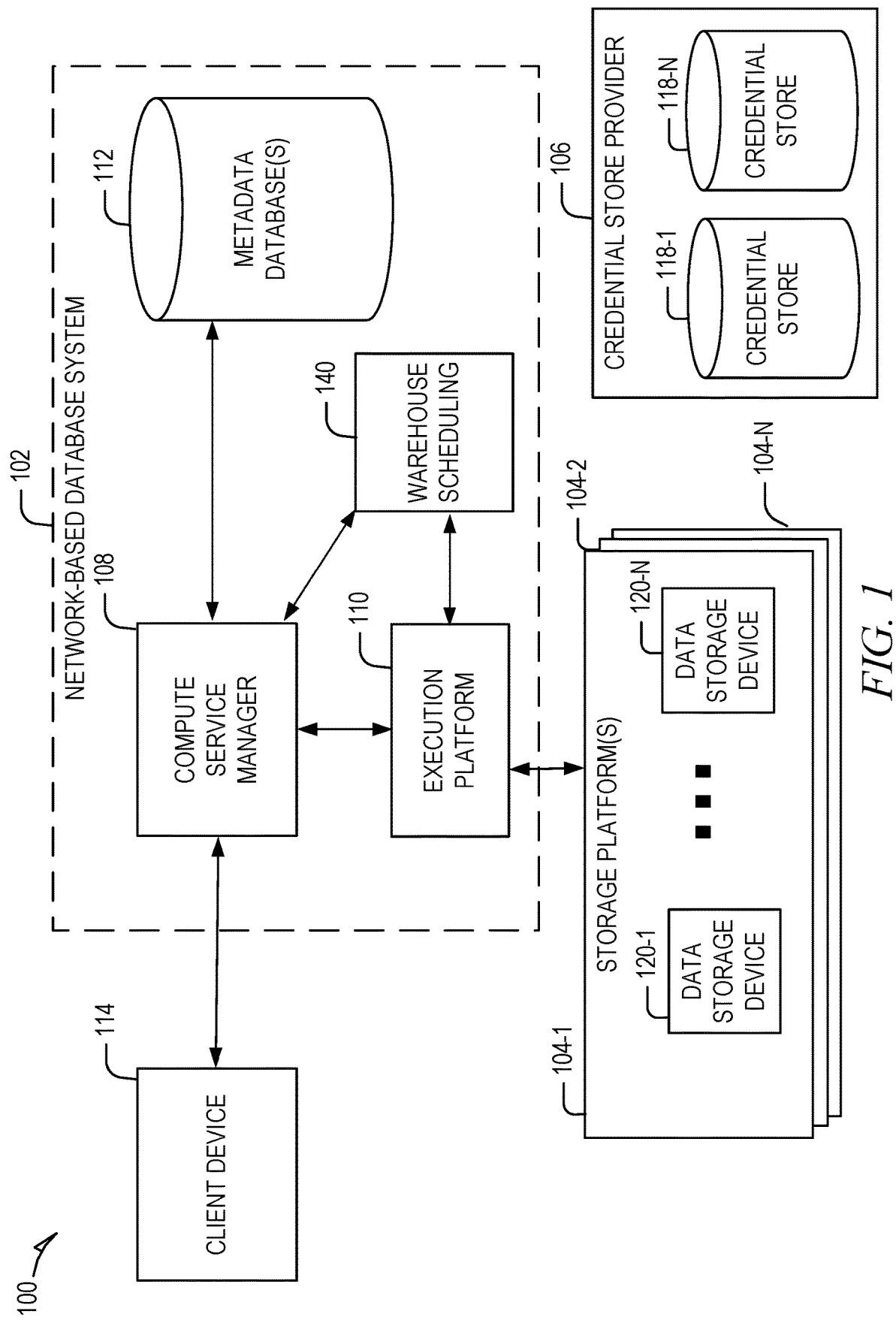
FIG. 1 illustrates an example computing environment that includes a network-based database system in communication with a cloud storage platform, in accordance with some embodiments of the present disclosure.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104-1 (e.g., AWS S3®, Microsoft Azure Blob Storage®, or Google Cloud Storage), and a cloud credential store provider 106 that stores credentials in one of the remote credential stores 118-1 to 118-N. The network-based database system 102 is a network-based system used for reporting and analysis of integrated data from one or more disparate sources including one or more storage locations within the cloud storage platform 104-1. The cloud storage platform 104-1 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104-1) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 120-1 to 120-N, and each other storage platform can also include multiple data storage devices. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like. Similarly, any of the data storage devices in other storage platforms as discussed further herein can also have similar characteristics described above in connection with storage platform 104-1.

In an embodiment, each storage platform can provide a different domain or type of storage. For example, storage platform 104-1 may provide storage for a database that stores tables using micro-partitions as discussed further herein, and storage platform 104-2 may provide storage for linearizable storage corresponding to a distributed database (e.g., FoundationDB) that stores tables in a key-value format. Thus, in an implementation, different storage platforms can be utilized for cross domain transactions against different types of databases as discussed further below. In another embodiment, the same storage platform can be utilized for such cross domain transactions where different data storage devices (e.g., data storage device 120-1 and data storage device 120-N) can be utilized for a first type of database (database tables based on micro-partitions) and a second type of database (e.g., linearizable storage tables).

As shown in FIG. 1, the data storage devices 120-1 to 120-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104-1, are shown in FIG. 1 as individual discrete components. However, each of the compute service manager 108, metadata database(s) 112, execution platform 110, and storage platform 104-1 may be implemented as a distributed system (e.g., distributed across multiple systems/platforms at multiple geographic locations). Additionally, each of the compute service manager 108, metadata database(s) 112, execution platform 110, and storage platform 104-1 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104-1. It is desirable to retrieve as much data as possible from caches within the execution platform 110 because the retrieval speed is typically much faster than retrieving data from the cloud storage platform 104-1.

As shown in FIG. 1, the network-based database system 102 includes a warehouse scheduling component 140 that implements scheduling of jobs or transactions involving queries (e.g., compiled query plans), according to some embodiments. In an example, the warehouse scheduling component 140 receives a job that may be divided into one or more discrete transactions, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform.

The warehouse scheduling component 140 may assign the job, including the multiple discrete transactions, to a particular virtual warehouse of the execution platform 110. Based on this assignment, the warehouse scheduling component 140 can send the job, including the multiple discrete transactions, to the assigned virtual warehouse for execution. Alternatively, the warehouse scheduling component 140 can send a subset of the transactions included in the job for execution by the execution platform 110.

In an embodiment, as described further herein, the warehouse scheduling component 140 can perform operations to process transactions (e.g., OLTP) that may be executing concurrently, while handling conflicts and avoiding starvation of resources. As further shown, the execution platform 110 communicates with the storage platform 104, which provides a distributed database (e.g., FoundationDB, and the like), where data can be read and written in connection with performing the transactions.

In an embodiment, the warehouse scheduling component 140 schedules and manages the execution of transactions on behalf of a client account. The warehouse scheduling component 140 may schedule any arbitrary SQL query included in a given transaction.

In embodiments, the compute service manager 108 is also coupled to one or more metadata databases 112 that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

As shown in FIG. 1, the computing environment 100 separates the execution platform 110 from the storage platform 104-1. In this arrangement, the processing resources and cache resources in the execution platform 110 operate independently of the data storage devices 120-1 to 120-N in the cloud storage platform 104-1. Thus, the computing resources and cache resources are not restricted to specific data storage devices 120-1 to 120-N. Instead, all computing resources and all cache resources may retrieve data from, and store data to, any of the data storage resources in the cloud storage platform 104-1.

Figure 2:
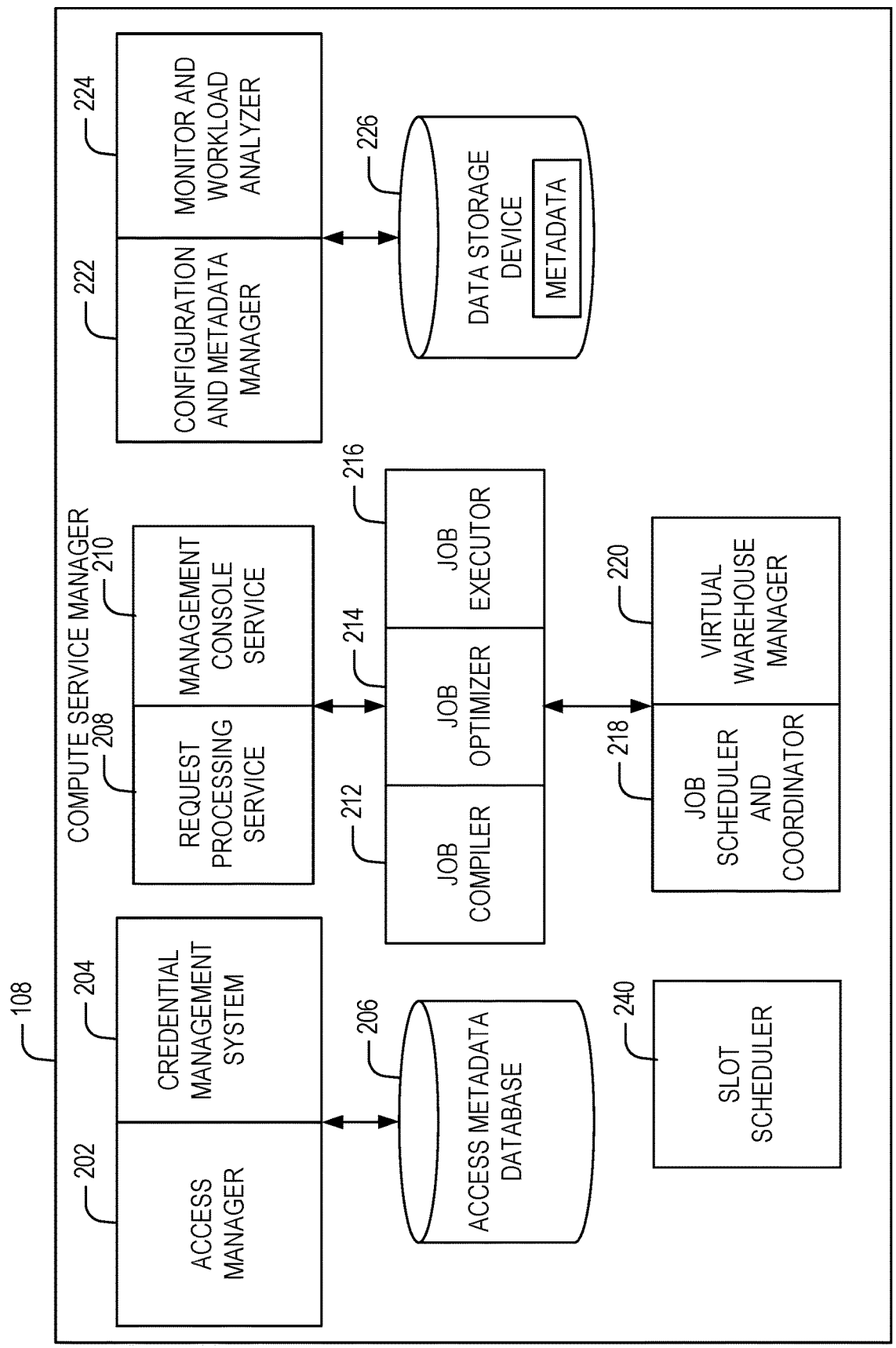
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104-1.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104-1) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104-1, or any other storage device.

As further shown, compute service manager 108 includes slot scheduler 240. As described further herein, slot scheduler 240 corresponds to a warehouse scheduling component for HTAP/OLTP ("WS4HTAP") that pre-allocates resources on an execution platform (e.g., providing virtual warehouses each including a number of execution nodes and the like) in allotments or groupings of resources referred to herein as "slots" or a "slot". Such slots represent an amount of memory and DOP (degree of parallelism) on a specific virtual warehouse(s). A slot can be allocated for a particular time. In an example, slot scheduler 240 enables local scheduling of jobs or transactions involving queries (e.g., compiled query plans). Although slot scheduler 240 is shown as a separate component in the example of FIG. 2, in an embodiment, slot scheduler 240 is a component provided by job scheduler and coordinator 218.

Figure 3:
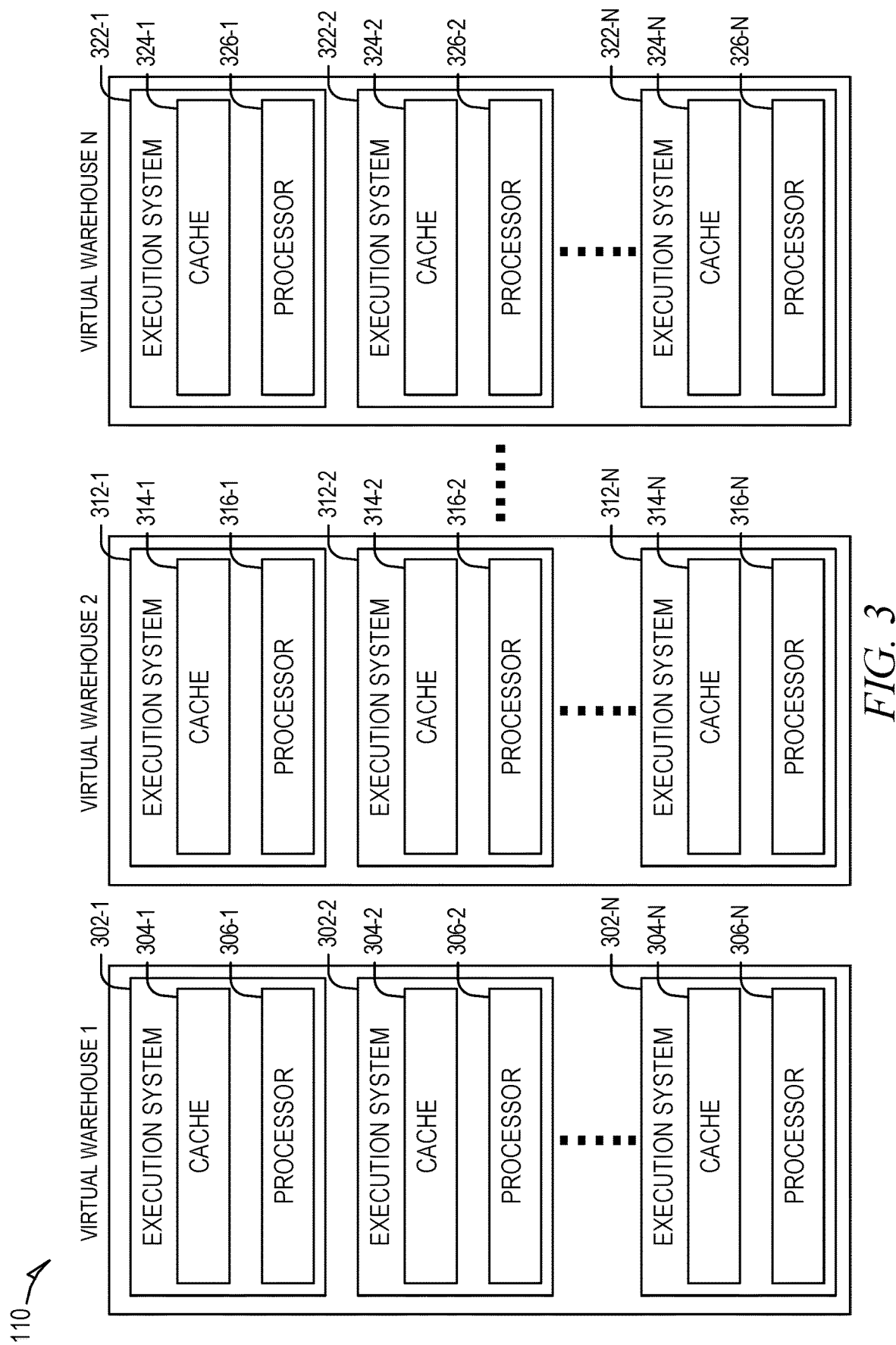
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104-1).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104-1. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104-1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104-1.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104-1, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Embodiments of the subject technology enable faster scheduling of database queries (e.g., involving query statements such as SQL) with restricted resource requirements. In an example, this particular case this is achieved by reducing the actual time that the scheduler needs to make the decision if a database job can run or not from multiple milliseconds to zero.

In some approaches, database jobs are scheduled by performing an inventory of all resources available and then deciding based on the result of the inventory if it is possible to schedule the job (e.g., using warehouse scheduling component 140).

In some instances, some database jobs tend to be very time sensitive (2 milliseconds being a long time), and scheduling decisions that take a long period of time can have a negative impact on the runtime of such jobs. Embodiments of the subject technology reduce scheduling decision overhead for database jobs and immediately decides whether a given database job(s) can be executed (or not).

A described in embodiments herein, a warehouse scheduling component for HTAP/OLTP ("WS4HTAP" corresponding to slot scheduler 240) pre-allocates resources on an execution platform (e.g., providing virtual warehouses each including a number of execution nodes and the like) in allotments or groupings of resources referred to herein as "slots" or a "slot". Such slots represent an amount of memory and DOP on a specific virtual warehouse(s). The compute time, number of threads and memory are configurable at runtime, except for the server they belong to.

For example, a slot can include the following resources:
1. 5s compute time (e.g., amount of time for execution)
2. 1 execution thread (e.g., single CPU)
3. 256 MiB of memory (e.g., amount of memory)
4. server no. 115 (e.g., particular execution node)

If a database job does not consume more resources as provided by a given slot, the job gets marked to be scheduled via slot scheduler 240. The job is then sent to the slot scheduler 240, which selects the next available slot. If a slot is available (e.g., not currently being utilized to process another job), the job is sent to the corresponding execution node of the selected slot for execution. Alternatively, when no slot is available, slot scheduler 240 requests additional slots from warehouse scheduling component 140.

The discussion further below describes how slot scheduler 240, along with warehouse scheduling component 140, performs scheduling of database requests (e.g., jobs) with respect to utilizing a number of available slots.

Figure 4A:
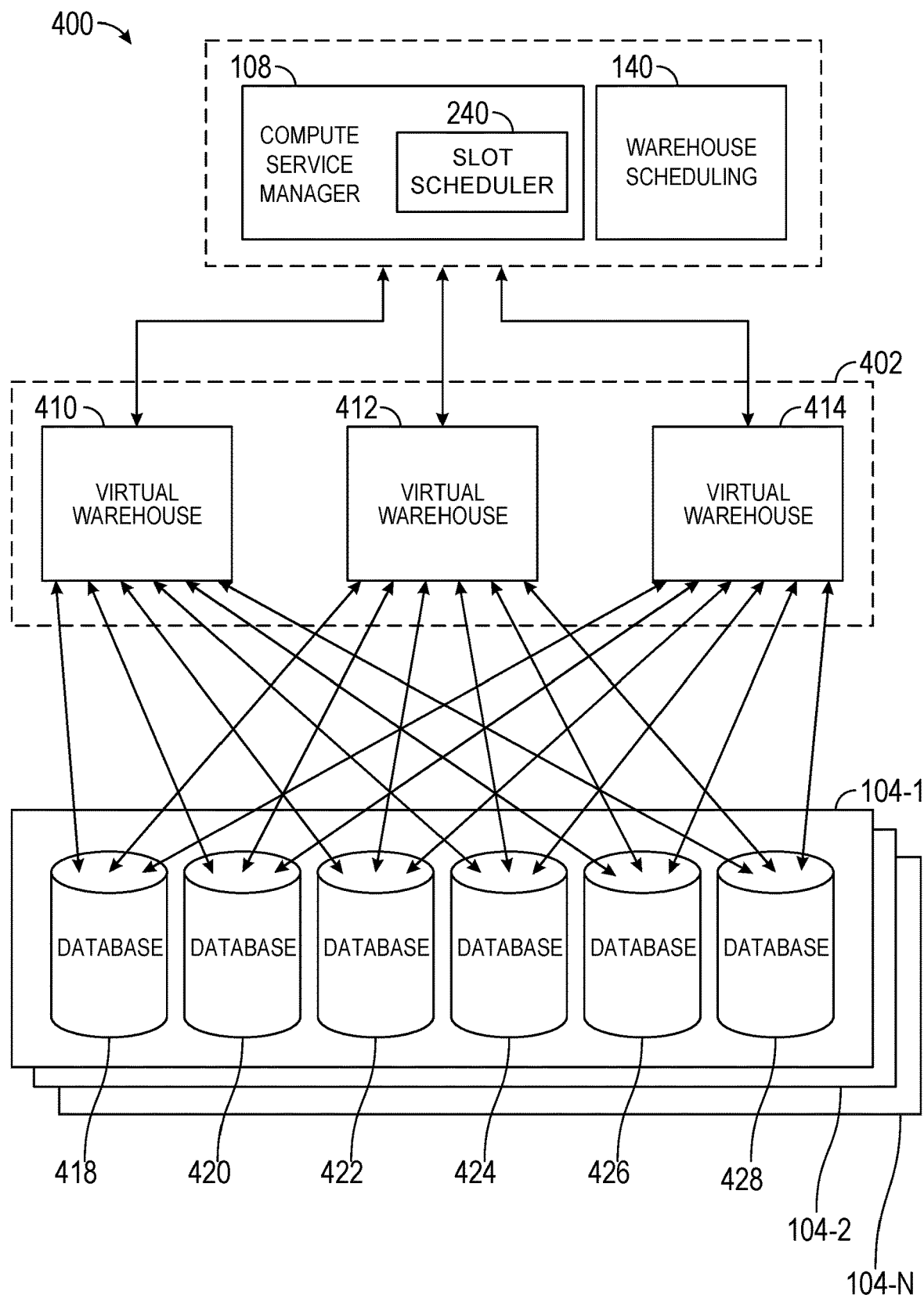
FIG. 4A is a block diagram depicting an embodiment of a computing environment with a slot scheduler with access to multiple virtual warehouses for scheduling jobs (e.g., database queries).

FIG. 4A is a block diagram depicting an embodiment of a computing environment 400 with a slot scheduler with access to multiple virtual warehouses for scheduling jobs (e.g., database queries). Environment 400 includes compute service manager 108 with slot scheduler 240, warehouse scheduling component 140, and multiple virtual warehouse 410, virtual warehouse 412, and virtual warehouse 414 arranged in a virtual warehouse group 402. In particular, multiple users can access storage platform 104-1 including database 418, database 420, database 422, database 424, database 426, and database 428 through warehouse scheduling component 140 and virtual warehouse group 402. Although not shown, it is understood that storage platform 104-2 to storage platform 104-N can include any number of databases similar to storage platform 104-1, which multiple user can also access through warehouse scheduling component 140. Moreover additional virtual warehouse groups can be provided to access such databases included in storage platform 104-2 to storage platform 104-N. In some embodiments, users can access warehouse scheduling component 140 through compute service manager 108.

As illustrated, each virtual warehouse is configured to communicate with any (or all) of database 418, database 420, database 422, database 424, database 426, and database 428.

In an embodiment, each virtual warehouse can be configured to communicate with only a subset of database 418, database 420, database 422, database 424, database 426, and database 428. For example, in computing environment 400, virtual warehouse 410 can be configured to communicate with database 418, database 420, and database 422. Similarly, virtual warehouse 412 can be configured to communicate with database 420, database 424, and database 426. And, virtual warehouse 414 can be configured to communicate with database 422, database 426, and database 428.

Although computing environment 400 shows one virtual warehouse group 402, alternate embodiments may include any number of virtual warehouse groups, each associated with any number of virtual warehouses. For example, different virtual warehouses may be created for each customer or group of users, and for virtual warehouses in different regions. Additionally, different virtual warehouses may be created for different entities, or any other group accessing different data sets. Multiple virtual warehouse groups may have different sizes and configurations. The number of virtual warehouse groups in a particular environment is dynamic and may change based on the changing needs of the users and other systems in the environment.

Users may submit data retrieval and data storage requests (e.g., database jobs including SQL queries or statements, and the like) to slot scheduler 240, which routes the data retrieval and data storage requests to an appropriate virtual warehouse in virtual warehouse group 402. In some implementations, slot scheduler 240 provides a dynamic assignment of such requests to virtual warehouses for execution thereby enabling distributing multiple requests across the virtual warehouses based on available resources (e.g., a number of available slots), and current resource loads, among other types of considerations as discussed further below.

The following discussion relates to lightweight queries.

In an example, a lightweight query has a short runtime and a small memory and processor/CPU footprint. A query compiler (e.g., job compiler 212) determines whether a given query is considered as "lightweight" and sets a flag indicating that the query is lightweight accordingly. Hard limits to the runtime and memory consumption of a lightweight query are enforced by the subject system, and the lightweight query is terminated during execution when the query exceeds such runtime or memory limits. The killed job then has its lightweight-flag unset and rescheduled again, this time as a regular job (e.g., not lightweight).

In an embodiment, the following hard limits (e.g., global restrictions) are provided for lightweight queries:
1. Runtime of less than 5s
2. DOP (degree of parallelism) of 1
3. Memory consumption of less than 1% of the total available memory of a single server/virtual warehouse or 200MiB if the server/virtual warehouse has more than 16GiB memory.

To show a comparison between the slot scheduler 240, the following discussion relates to an overview of a scheduling approach utilized by warehouse scheduling component 140 that schedules jobs without utilizing slots.

Figure 4B:
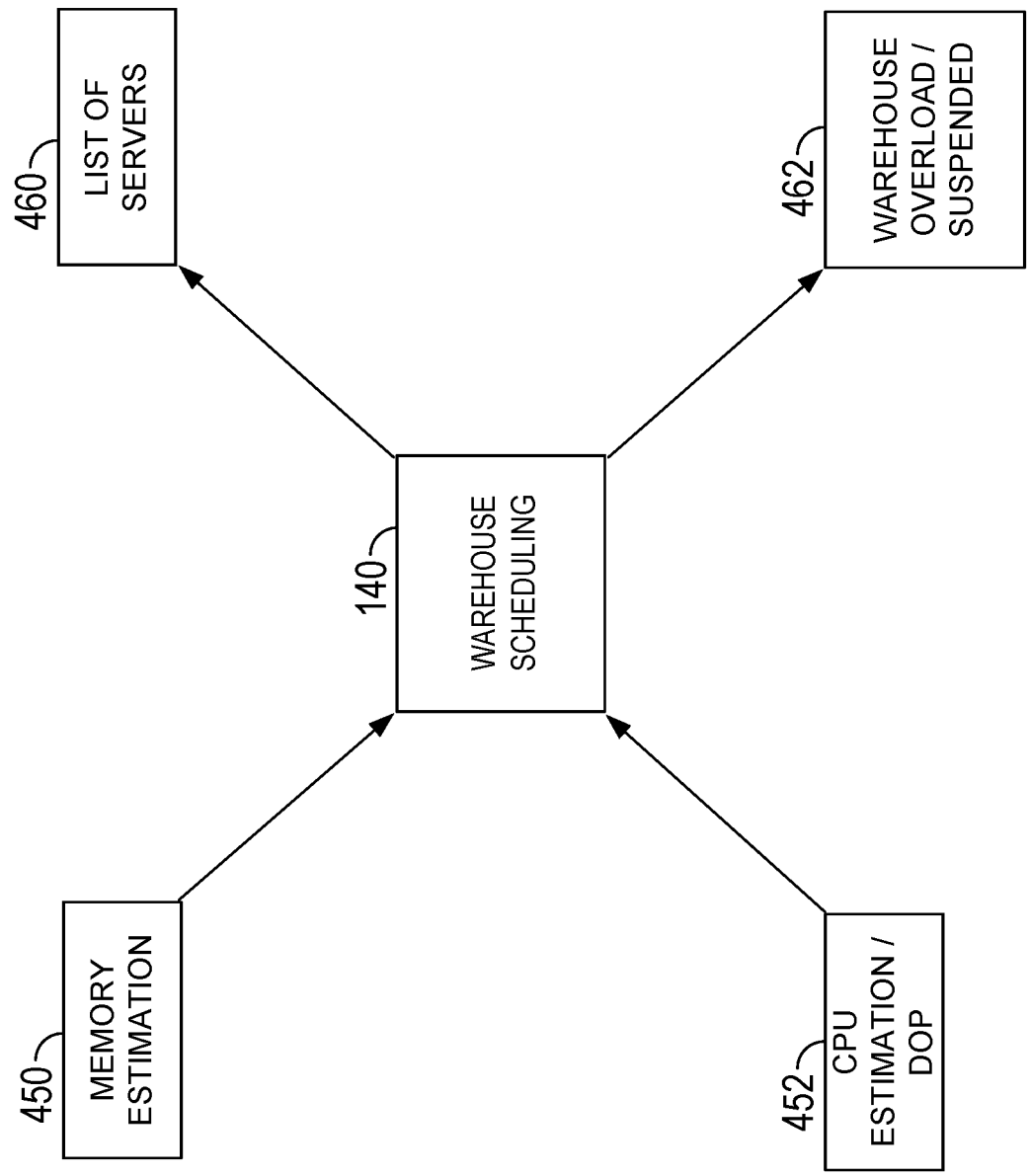
FIG. 4B illustrates an example diagram of a processing flow of operations performed by a warehouse scheduling component in accordance with embodiments of the subject technology.

FIG. 4B illustrates an example diagram of a processing flow of operations performed by a warehouse scheduling component in accordance with embodiments of the subject technology.

As shown in the example of FIG. 4B, warehouse scheduling component 140 takes memory estimation 450 and CPU (DOP) estimation 452 as inputs (e.g., provided by compute service manager 108) and provides an output of a list of servers 460. Moreover, it is possible that the request is blocked/queued if the virtual warehouse is overloaded or suspended 462. Each virtual warehouse may be monitored and a current warehouse state (e.g., utilized CPU and memory) is determined. When a job is scheduled, the CPU and memory estimation are added to the warehouse state (e.g., to indicate a decrease of available resources at the virtual warehouse), whereas when a job is unscheduled the CPU and memory estimation are subtracted from the warehouse state (e.g., to indicate more available resources).

In addition, warehouse scheduling component 140 keeps a list of running/queued jobs in the virtual warehouse and decides which queue that each new job is to be placed in. In an example, jobs are processed in a first-in-first-out (FIFO) order.

The following discussion relates to scheduling on reserved slots by slot scheduler 240, which begins a discussion highlighting a different scheduling approach than the above.

To enable local scheduling while adhering to global restrictions on a virtual warehouse load, slot scheduler 240 reserves capacity in warehouse scheduling component 140 and is then free to independently schedule jobs on this capacity. In an example, this can reduce the communication between slot scheduler 240 and warehouse scheduling component 140 significantly, as the reserved capacity can be used to run many small jobs, which avoids the communication with warehouse scheduling component 140.

In particular, the reserved capacity in slots is measured, where each slot provides sufficient resources for one lightweight query. Next, slot scheduler 240 can request slots from warehouse scheduling component 140 and use them to run incoming lightweight queries. In an implementation, a lease time is associated with a slot. These leases (e.g., associated with slots) are set to expire after a few seconds automatically, and slot scheduler 240 renews them regularly and scales them up or down depending on the expected load.

The following discussion relates to describing a slot in greater detail.

In implementation, a slot represents 1 degree of parallelism (DOP) and a specific amount of memory on a specific server/virtual warehouse for a limited time. The slot provides sufficient resources for a single lightweight query and is used by one query at a time. This a 1:1 relationship between queries and slots is provided in an embodiment.

Since each slot belongs to a specific server/virtual warehouse, slot scheduler 240 schedules jobs on a server level.

The following discussion relates to slot management on slot scheduler 240.

For an incoming query, the job compiler 212 determines whether it is considered lightweight. If it is not lightweight, it will be sent to warehouse scheduling component 140 and go through a normal scheduling flow (e.g., scheduling to be executed not using a slot). Otherwise, it will be scheduled on the slots reserved by slot scheduler 240, assuming there are enough free slots available. If slot scheduler 240 is out of slots, the query will be placed in a queue in the slot scheduler 240. The jobs in the queue will be processed on a FIFO basis, once free slots are available again.

In an embodiment, each instance of slot scheduler 240 is guaranteed to get at least one slot.

In an example, slot scheduler 240 manages its slots, which can happen at two different occasions:
1. Whenever lightweight jobs are getting queued, slot scheduler 240 will notify warehouse scheduling component 140 so that additional slots can be allocated
2. slot scheduler 240 periodically and asynchronously updates its slot leases. During this update it also checks if slots can be handed back to warehouse scheduling component 140.

The following discussion relates to corner cases.

In an example, slot scheduler 240 decides which slots to hand back to warehouse scheduling component 140. Further, warehouse scheduling component 140 tries not to intervene with that except for 2 occasions:
1. The topology changed. Thus, warehouse scheduling component 140 will send a new list of slots available to slot scheduler 240. If possible the number of new slots returned matches the number of current slots. However, if an execution node quits unexpectedly this might not be the case
2. When warehouse scheduling component 140 receives an OLAP query and all resources have been assigned to slot scheduler 240. Then warehouse scheduling component 140 reclaims the needed slots from one or more instances of slot scheduler 240. The number of concurrent OLAP queries should be configurable via a warehouse parameter (e.g., 1).

In an implementation, additional slots are requested if a large percentage, for example more than 90% of the available slots are used. The goal is that a high percentage (e.g. 99.9%) of lightweight queries can be scheduled immediately without having to wait for a call to warehouse scheduling component 140.

The following discussion relates to an additional overview of warehouse scheduling component 140.

In some instances, warehouse scheduling component 140 can reacquire the issued slots. For that purpose, all slots are only leased for a short while (e.g. 5 seconds) and expire automatically. Consequently, each slot scheduler 240 regularly (e.g., each 2 seconds) sends asynchronous requests to renew its lease.

Further, warehouse scheduling component 140 remains in charge of managing the warehouse load and is responsible to hand out the slots to different compute service managers (e.g., when there are more than one instance). In an example, the slot allocation to compute service managers is done in a random manner.

If a slot is added or removed, warehouse scheduling component 140 adjusts its available resources for that virtual warehouse accordingly. Since the lease for a slot is only valid for a few seconds, warehouse scheduling component 140 also takes care of removing expired leases.

While satisfying requests for slots is generally performed, warehouse scheduling component 140 can also fulfill such requests only partially or deny them, depending on the current load of the virtual warehouse. For instance, warehouse scheduling component 140 can grant fewer slots in order to free sufficient capacity for waiting OLAP jobs. Further, in contrast to regular queries, a lease request is not queued.

In an embodiment, as soon as warehouse scheduling component 140 receives an OLAP query, it takes action that at least one OLAP query can be run at a time.

In an example, warehouse scheduling component 140 receives the slot scheduler 240 requests and stores following information:
  Slots used per slot scheduler 240
  Lease time per slot
  Timestamp last request received per slot scheduler 240

The following discussion relates to updates to warehouse topology.

Warehouse topology updates are communicated by warehouse scheduling component 140 to each instance of slot scheduler 240 by changing the slots that are allocated to each instance of the slot scheduler 240. If a cluster has to be spun down, warehouse scheduling component 140 does not renew the leases for slots of servers/virtual warehouses in that cluster. In some instances, warehouse scheduling component 140 provides exchange slots to the slot scheduler 240 to keep the number of slots constant.

The following discussion relates to various algorithms related to warehouse scheduling component 140. More specifically, the following discussion relates to 1) slot distribution, 2) OLAP handling, 3) slot collection, 4) slot requesting, and 5) slot bundling.

In an embodiment, warehouse scheduling component 140 handles slot distribution, in particular if the load is not distributed evenly across slot scheduler 240 and the system is approaching its limits. Next, warehouse scheduling component 140 decides how to distribute the slots across the slot scheduler 240 in such a way that the system functions as long as possible. Each time the slot scheduler 240 sends a request to warehouse scheduling component 140, a current status is also report that includes the following information:
  Used slots
  Unused slots
  Number of HTAP jobs queued (short: queued)

In an embodiment, unused slots are reclaimed by warehouse scheduling component 140 and added to a free slot pool. This pool is distributed between instances of slot scheduler 240 that have queued jobs, and other instances slot scheduler 240 are considered already operating within acceptable limits. In this embodiment, warehouse scheduling component 140 does not redistribute already handed out slots to optimize the throughput of slot scheduler 240. If slot scheduler 240 can return a slot it will do so but until then warehouse scheduling component 140 assumes slot scheduler 240 has just enough slots to perform its work and forcefully removing a slot could possibly result in unnecessary queueing.

The following examples describe techniques for distributing slots:
1. As soon as a slot scheduler 240 reports queueing. This approach reacts immediately to queueing by sending a free slot from warehouse scheduling component 140 to the slot scheduler 240. The time of the slot allocation is recorded and a parameter (e.g., delayBetweenAllocations) prevents the slot scheduler 240 from immediately requesting another slot.
2. Wait until a certain amount of queueing happens and then redistribute all free slots at once. This approach is round based, in a separate thread after a certain amount of time the current status of each slot scheduler 240 is checked. If one slot scheduler 240 reaches a threshold all free slots are handed out to other instances of slot scheduler 240 that have jobs queued based on their queue length. This approach assumes that queueing might eventually go away but is very aggressive if it persists.
3. Regularly check if queueing occurred and hand out one slot to each slot scheduler 240 that has queued jobs. This is very similar to #2 but with two distinct changes. First, only one slot per slot scheduler 240 is allocated per round, and second there is no threshold. If a slot scheduler 240 has any jobs queued during a round, it receives a free slot.

The following examples describe techniques for OLAP handling.

In embodiments, a given virtual warehouse handles a mixed workload, and ensures that OLAP queries are not starved. To prevent the starvation of OLAP queries, warehouse scheduling for HTAP/OLTP ensures that if an OLAP query is received then it is guaranteed to get executed.

If enough slots are available, warehouse scheduling component 140 handles the query in the manner discussed before. However, when there are too many slots allocated to slot scheduler 240, warehouse scheduling component 140 will force enough slots back to execute one OLAP query at a time. This means that 8 slots (=number of CPUs) per server are 'reserved' for an OLAP workload. These slots might be handed out to instances of slot scheduler 240 but can be forced back at any time. In an example where a given virtual warehouse has 64 slots, 56 slots are remaining for slot scheduler 240, and this satisfies the requirement that each instance of slot scheduler 240 has at least one slot.

Each instance of slot scheduler 240, on a periodic basis, renews its slot leases. During this renewal, an analysis is performed if slots can be returned to warehouse scheduling component 140. For each slot that slot scheduler 240 owns, it records the utilization in percent since the last lease renewal.

In an example, the number of slots to return is then calculated as follows:

```
computingReserve = warehouse.getParameter(
  WarehouseParameters.WS_HTAP_FG_COMPUTING_RESERVE);
  totalUsedSlots = sum(slot utilization)
  numberOfSlotsToReturn = max(0, roundDown(length(slots) –
(totalUsedSlots + computingReserve))));
if(totalUsedSlots == 0)
  returnAllSlots2warehouse scheduling component 140( )
else
  handleReturn2warehouse scheduling component 140
(numberOfSlotsToReturn)
```

WS_HTAP_FG_COMPUTING_RESERVE specifies how many percent of a slot a slot scheduler 240 should hold onto to handle spikes (aka overprovision slots). This value should not be set to 0 to prevent a back and forth of slots between warehouse scheduling component 140 and slot scheduler 240.

In an embodiment, each slot is provided a number and the slots with lower numbers are preferred to schedule jobs. If a slot with a high number is then unused for one to two cycles it would be freed.

The following discussion relates to slot requesting.

It can be assumed that it is better to oversubscribe than to have jobs queuing. As soon as queuing happens, the slot scheduler 240 sends a message to warehouse scheduling component 140 to request one additional slot. Next, warehouse scheduling component 140 then acknowledges this slot request. The acknowledgement message may or may not contain an additional slot to be used by the slot scheduler 240.

In an implementation, the value of WS_HTAP_FG_COMPUTING_RESERVE mentioned above is chosen to prevent a back and forth of slots between a single slot scheduler 240 and warehouse scheduling component 140.

Since slots are exchangeable, in embodiments, balancing the slots allocated to a slot scheduler 240 across servers of a cluster or across the clusters of a warehouse is to be avoided. This means slots are randomly distributed across the warehouse until the slot bundling of multi-cluster warehouses is performed.

The following discussion relates to slot bundling for multi-cluster warehouses.

For multi-cluster warehouses, the spinning up and down (e.g., starting up and shutting down) of clusters has to be considered. The spinning up of clusters (e.g., starting up) is addressed by having each slot scheduler 240 send a request for additional slots if it starts to queue and this can be used to determine if the current warehouse needs to spin up another cluster.

Since each instance of slot scheduler 240 may not have information regarding clusters (e.g., because slots are indistinguishable from each other), it does not consider clusters on slot collection. Over time, the slot distribution on a multi-cluster warehouse can be fragmented (aka random). This can be problematic when deciding if a cluster can be spun down. For this reason, warehouse scheduling component 140 regularly performs a defragmentation during maintenance processes.

Figure 5:
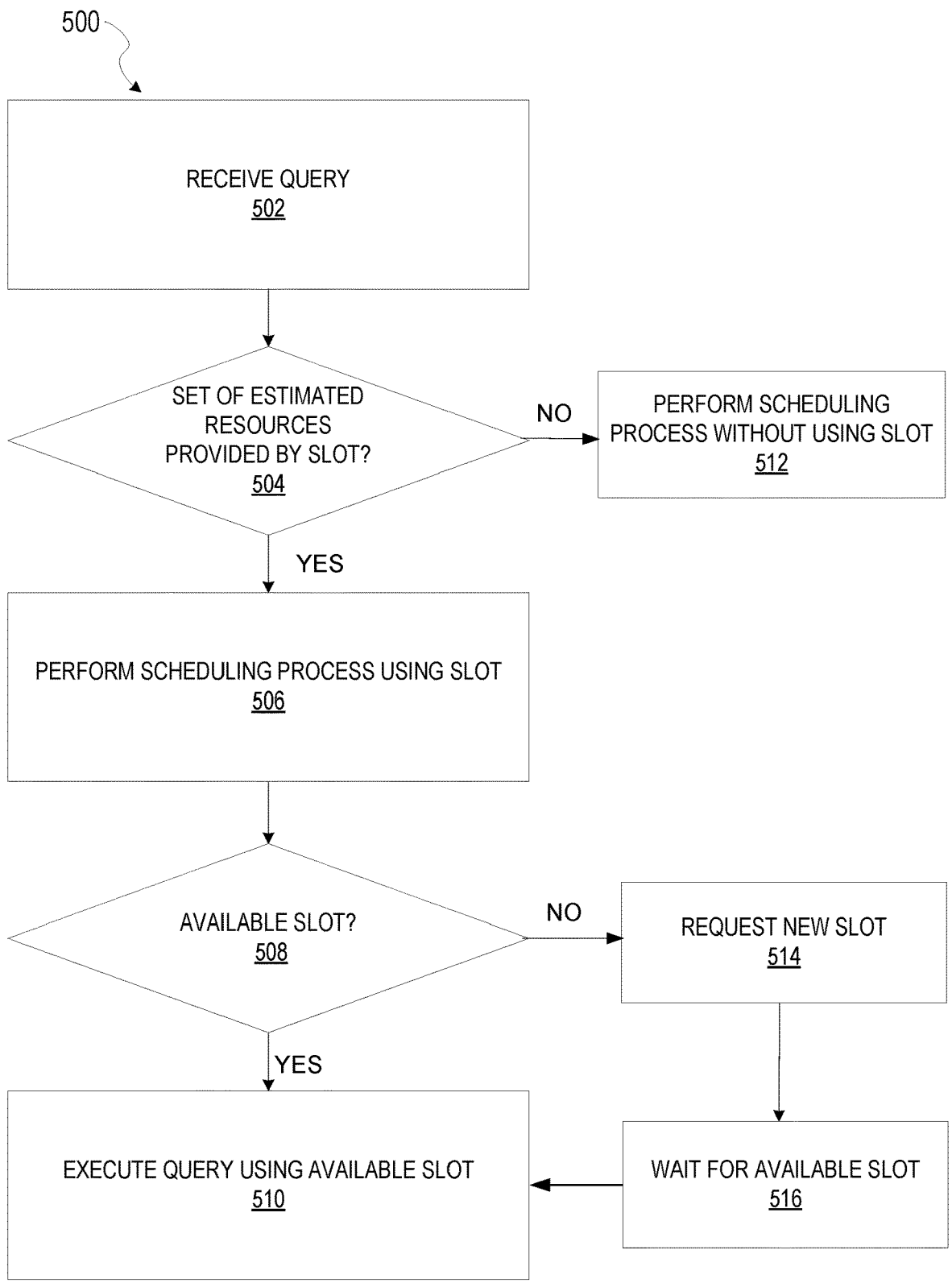
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or warehouse scheduling component 140. Accordingly, the method 500 is described below, by way of example with reference thereto. However, it shall be appreciated that the method 500 may be deployed on various other hardware configurations and is not intended to be limited to deployment within the network-based database system 102.

At operation 502, slot scheduler 240 receives a query, the query comprising a set of query statements.

At operation 504, slot scheduler 240 determines that a set of resources to be utilized by the query during execution is provided by a slot, the slot comprising an allocation of resources provided by a virtual warehouse.

In an example, the slot corresponds to a degree of parallelism (DOP) of one and a specific amount of memory on the virtual warehouse for an amount of time.

In an example, determining that the set of resources to be utilized by the query comprises determining that the query is considered a lightweight query based on an analysis performed by a query compiler during compilation of the query.

In an example, the lightweight query comprises a runtime of less than a particular period of time, a degree of parallelism of one, and a memory consumption of less than a threshold percentage of a total available memory of the virtual warehouse.

Alternatively, at operation 512, slot scheduler 240 performs a second scheduling process without using the slot.

In an example, performing the second scheduling process includes sending the query to a warehouse scheduling component (e.g., warehouse scheduling component 140) to perform the second scheduling process, the warehouse scheduling component being separate from a compute service manager.

At operation 506, slot scheduler 240 performs a first scheduling process for execution of the query using the slot.

In an example, performing the first scheduling process for execution of the query using the slot comprises: sending a request for at least one slot from a warehouse scheduling component.

At operation 508, slot scheduler 240 determines that an available slot is provided by the virtual warehouse.

In an example, determining that the available slot is provided by the virtual warehouse comprises sending a request to renew a lease of the available slot.

Alternatively, continuing from operation 508, at operation 514, slot scheduler 240 requests a new slot corresponding to the available slot.

At operation 516, slot scheduler 240 waits for the available slot by placing the query in a queue for the new slot.

Continuing from operation 508 or operation 516, at operation 510, slot scheduler 240 executes, using the virtual warehouse, the query using the available slot.

In an example, executing, using the virtual warehouse, the query using the available slot comprises: sending the query to the virtual warehouse for execution.

Figure 6:
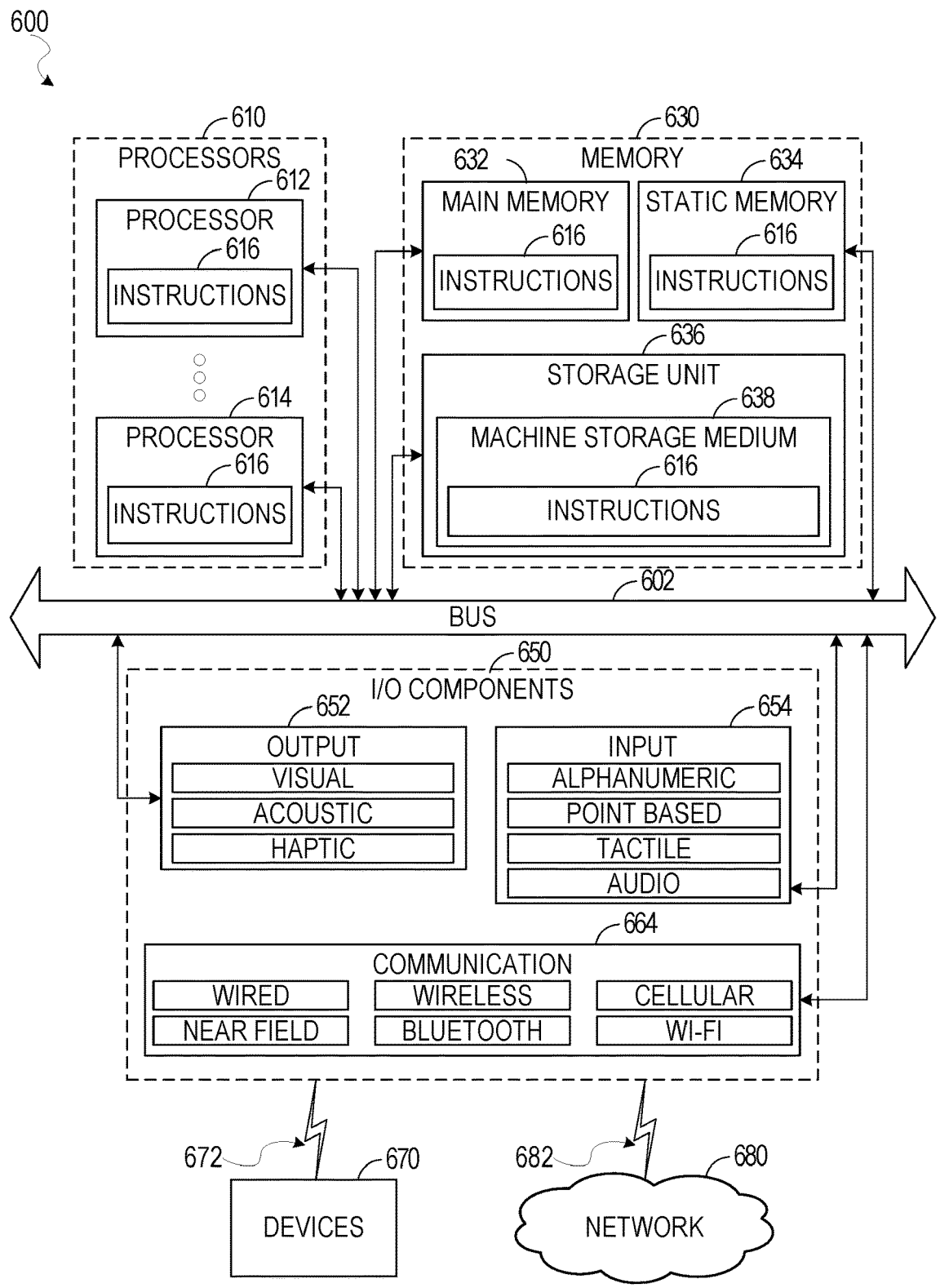
FIG. 6 illustrates a diagrammatic representation of a machine in the form of a computer system within which a set of instructions may be executed for causing the machine to perform any one or more of the methodologies discussed herein, in accordance with some embodiments of the present disclosure.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute any one or more operations of the methods described above. As another example, the instructions 616 may cause the machine 600 to implement portions of the data flows illustrated herein. In this way, the instructions 616 transform a general, non-programmed machine into a particular machine 600 (e.g., the compute service manager 108 or a node in the execution platform 60) that is specially configured to carry out any one of the described and illustrated functions in the manner described herein.

In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and input/output (I/O) components 650 configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within machine storage medium 638 of the storage unit 636, within at least one of the processors 610 (e.g., within the processor's cache memory), or any suitable combination thereof, during execution thereof by the machine 600.

The I/O components 650 include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)). For example, as noted above, the machine 600 may correspond to any one of the compute service manager 108 or the execution platform 60, and the devices 670 may include the client device 64 or any other computing device described herein as being in communication with the network-based database system 102 or the cloud storage platform 104-1.

Executable Instructions and Machine Storage Medium

The various memories (e.g., 630, 632, 634, and/or memory of the processor(s) 610 and/or the storage unit 636) may store one or more sets of instructions 616 and data structures (e.g., software) embodying or utilized by any one or more of the methodologies or functions described herein. These instructions 616, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. The performance of certain of the operations may be distributed among the one or more processors, not only residing within a single machine, but also deployed across a number of machines. In some embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   reserving, by a slot scheduler component, capacity to execute an incoming query via communication with a warehouse scheduling component, the warehouse scheduling component managing the capacity of a set of virtual warehouses for executing the incoming query, the reserved capacity comprising a set of slots, each slot comprising an allocation of resources provided by a particular virtual warehouse from the set of virtual warehouses, the slot scheduler component being provided by a compute service manager, the compute service manager being separate from the warehouse scheduling component, the communication with the warehouse scheduling component comprising the slot scheduler component sending a request for the capacity to execute the incoming query;

storing, by the warehouse scheduling component, information related to the request from the slot scheduler component, the information comprising a set of slots utilized by the slot scheduler component, a lease time per slot, and a timestamp of a last request received from the slot scheduler component;

receiving a query from a client device, the query comprising a set of query statements;

determining, by a query compiler during compilation of the query received from the client device, that the query, when executed, includes a runtime of less than a predetermined time, the query compiler being provided by the compute service manager, the compute service manager being separate from the set of virtual warehouses;

determining, by the slot scheduler component, that a set of resources to be utilized by the query during execution is provided by a slot from the set of slots, the slot corresponding to a specific amount of memory on a virtual warehouse for an amount of time, the determining based at least in part on determining that execution of the query does not consume more than the specific amount of memory as provided by the slot;

performing a first scheduling process for execution of the query using the slot;

determining that an available slot is provided by the virtual warehouse; and executing, using the virtual warehouse, the query using the available slot.

2. The system of claim 1, wherein the operations further comprise:

determining that the set of resources to be utilized by the query is not provided by the slot; and performing a second scheduling process without using the slot.

3. The system of claim 2, wherein performing the second scheduling process without using the slot comprises:

sending the query to a warehouse scheduling component to perform the second scheduling process.

4. The system of claim 1, wherein determining that the set of resources to be utilized by the query comprises:

determining that the query is considered a lightweight query based on an analysis performed by the query compiler during compilation of the query.

5. The system of claim 4, wherein the lightweight query comprises a runtime of less than a particular period of time, a degree of parallelism of one, and a memory consumption of less than a threshold percentage of a total available memory of the virtual warehouse.

6. The system of claim 1, wherein performing the first scheduling process for execution of the query using the slot comprises:

sending a request for at least one slot from a warehouse scheduling component.

7. The system of claim 1, wherein determining that the available slot is provided by the virtual warehouse comprises:

sending a request to renew a lease of the available slot.

8. The system of claim 1, wherein executing, using the virtual warehouse, the query using the available slot comprises:

sending the query to the virtual warehouse for execution.

9. The system of claim 1, wherein the operations further comprise:

requesting a new slot corresponding to the available slot; and waiting for the available slot by placing the query in a queue for the new slot.

10. The system of claim 1, wherein the operations further comprise:

determining, by the query compiler, that the query, when executed, utilizes less than a particular amount of memory; and in response to determining that the query, when executed, includes the runtime of less than the predetermined time and that the query utilizes less than the particular amount of memory, indicating, by the query compiler, that the query qualifies as a lightweight query.

11. The system of claim 10, wherein the operations further comprise:

prior to determining, by the slot scheduler component, that the set of resources to be utilized by the query during execution is provided by the slot:

in response to the query qualifying as the lightweight query based at least in part on the indicating, sending the query to the slot scheduler component to select an available slot for executing the query.

12. The system of claim 11, wherein the operations further comprise:

determining, by the slot scheduler component, that no slot from the set of slots is available;

placing, by the slot scheduler component, the query in a queue in response to determining that no slot is available; and sending a notification, indicating that no slot is available, to the warehouse scheduling component to allocate an additional set of slots.

13. A method comprising:

reserving, by a slot scheduler component, capacity to execute an incoming query via communication with a warehouse scheduling component, the warehouse scheduling component managing the capacity of a set of virtual warehouses for executing the incoming query, the reserved capacity comprising a set of slots, each slot comprising an allocation of resources provided by a particular virtual warehouse from the set of virtual warehouses, the slot scheduler component being provided by a compute service manager, the compute service manager being separate from the warehouse scheduling component, the communication with the warehouse scheduling component comprising the slot scheduler component sending a request for the capacity to execute the incoming query;

storing, by the warehouse scheduling component, information related to the request from the slot scheduler component, the information comprising a set of slots utilized by the slot scheduler component, a lease time per slot, and a timestamp of a last request received from the slot scheduler component;

receiving a query from a client device, the query comprising a set of query statements;

determining, by a query compiler during compilation of the query received from the client device, that the query, when executed, includes a runtime of less than a predetermined time, the query compiler being provided by the compute service manager, the compute service manager being separate from the set of virtual warehouses;

determining, by a scheduler component, that a set of resources to be utilized by the query during execution is provided by a slot from the set of slots, the slot corresponding to a specific amount of memory on a virtual warehouse for an amount of time, the determining based at least in part on determining that execution of the query does not consume more than the specific amount of memory as provided by the slot;

performing a first scheduling process for execution of the query using the slot;

determining that an available slot is provided by the virtual warehouse; and executing, using the virtual warehouse, the query using the available slot.

14. The method of claim 13, further comprising:
determining that the set of resources to be utilized by the query is not provided by the slot; and
performing a second scheduling process without using the slot.

15. The method of claim 14, wherein performing the second scheduling process without using the slot comprises:
sending the query to a warehouse scheduling component to perform the second scheduling process.

16. The method of claim 13, wherein determining that the set of resources to be utilized by the query comprises:
determining that the query is considered a lightweight query based on an analysis performed by the query compiler during compilation of the query.

17. The method of claim 16, wherein the lightweight query comprises a runtime of less than a particular period of time, a degree of parallelism of one, and a memory consumption of less than a threshold percentage of a total available memory of the virtual warehouse.

18. The method of claim 13, wherein performing the first scheduling process for execution of the query using the slot comprises:
sending a request for at least one slot from a warehouse scheduling component.

19. The method of claim 13, wherein determining that the available slot is provided by the virtual warehouse comprises:
sending a request to renew a lease of the available slot.

20. The method of claim 13, wherein executing, using the virtual warehouse, the query using the available slot comprises:
sending the query to the virtual warehouse for execution.

21. The method of claim 13, further comprising:
requesting a new slot corresponding to the available slot; and
waiting for the available slot by placing the query in a queue for the new slot.

22. A non-transitory computer-storage medium comprising instructions that, when executed by one or more processors of a machine, configure the machine to perform operations comprising:
reserving, by a slot scheduler component, capacity to execute an incoming query via communication with a warehouse scheduling component, the warehouse scheduling component managing the capacity of a set of virtual warehouses for executing the incoming query, the reserved capacity comprising a set of slots, each slot comprising an allocation of resources provided by a particular virtual warehouse from the set of virtual warehouses, the slot scheduler component being provided by a compute service manager, the compute service manager being separate from the warehouse scheduling component, the communication with the warehouse scheduling component comprising the slot scheduler component sending a request for the capacity to execute the incoming query;

storing, by the warehouse scheduling component, information related to the request from the slot scheduler component, the information comprising a set of slots utilized by the slot scheduler component, a lease time per slot, and a timestamp of a last request received from the slot scheduler component;

receiving a query from a client device, the query comprising a set of query statements;

determining, by a query compiler during compilation of the query received from the client device, that the query, when executed, includes a runtime of less than a predetermined time, the query compiler being provided by the compute service manager, the compute service manager being separate from the set of virtual warehouses;

determining, by the slot scheduler component, that a set of resources to be utilized by the query during execution is provided by a slot from the set of slots, the slot corresponding to a specific amount of memory on a virtual warehouse for an amount of time, the determining based at least in part on determining that execution of the query does not consume more than the specific amount of memory as provided by the slot;

performing a first scheduling process for execution of the query using the slot;

determining that an available slot is provided by the virtual warehouse; and executing, using the virtual warehouse, the query using the available slot.

23. The non-transitory computer-storage medium of claim 22, wherein the operations further comprise:
determining that the set of resources to be utilized by the query is not provided by the slot; and
performing a second scheduling process without using the slot.

24. The non-transitory computer-storage medium of claim 23, wherein performing the second scheduling process without using the slot comprises:
sending the query to a warehouse scheduling component to perform the second scheduling process.

25. The non-transitory computer-storage medium of claim 22, wherein determining that the set of resources to be utilized by the query comprises:
determining that the query is considered a lightweight query based on an analysis performed by the query compiler during compilation of the query.

26. The non-transitory computer-storage medium of claim 25, wherein the lightweight query comprises a runtime of less than a particular period of time, a degree of parallelism of one, and a memory consumption of less than a threshold percentage of a total available memory of the virtual warehouse.

27. The non-transitory computer-storage medium of claim 22, wherein performing the first scheduling process for execution of the query using the slot comprises:
sending a request for at least one slot from a warehouse scheduling component.

28. The non-transitory computer-storage medium of claim 22, wherein determining that the available slot is provided by the virtual warehouse comprises:
   sending a request to renew a lease of the available slot.

29. The non-transitory computer-storage medium of claim 22, wherein executing, using the virtual warehouse, the query using the available slot comprises:
   sending the query to the virtual warehouse for execution.

30. The non-transitory computer-storage medium of claim 22, wherein the operations further comprise:
   requesting a new slot corresponding to the available slot; and
   waiting for the available slot by placing the query in a queue for the new slot.

* * * * *

UNITED STATES PATENT AND TRADEMARK OFFICE
CERTIFICATE OF CORRECTION

| | | |
|---|---|---|
| PATENT NO. | : 12,242,496 B2 | Page 1 of 1 |
| APPLICATION NO. | : 18/151327 | |
| DATED | : March 4, 2025 | |
| INVENTOR(S) | : Kroll et al. | |

It is certified that error appears in the above-identified patent and that said Letters Patent is hereby corrected as shown below:

In the Claims

In Column 25, Line 50, in Claim 3, delete "a" and insert --the-- therefor

In Column 27, Line 5, in Claim 13, delete "a" and insert --the slot-- therefor

In Column 27, Line 26, in Claim 15, delete "a" and insert --the-- therefor

In Column 28, Line 48, in Claim 24, delete "a" and insert --the-- therefor

Signed and Sealed this
Twenty-fourth Day of June, 2025

Coke Morgan Stewart
*Acting Director of the United States Patent and Trademark Office*